US012798609B2

(12) United States Patent
Nakamura

(10) Patent No.: US 12,798,609 B2
(45) Date of Patent: Nov. 17, 2026

(54) VEHICLE

(71) Applicant: SUBARU CORPORATION, Tokyo (JP)

(72) Inventor: Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 344 days.

(21) Appl. No.: 18/169,472

(22) Filed: Feb. 15, 2023

(65) Prior Publication Data

US 2023/0286537 A1 Sep. 14, 2023

(30) Foreign Application Priority Data

Mar. 8, 2022 (JP) ................................ 2022-035599

(51) Int. Cl.
*B60W 60/00* (2020.01)
*B60W 40/12* (2012.01)
(Continued)

(52) U.S. Cl.
CPC .......... *B60W 60/001* (2020.02); *B60W 40/12* (2013.01); *B60W 50/14* (2013.01);
(Continued)

(58) Field of Classification Search
CPC .... B60W 60/001; B60W 40/12; B60W 50/14; B60W 2520/00; B60W 2556/40;
(Continued)

(56) References Cited

U.S. PATENT DOCUMENTS

| | | | | |
|---|---|---|---|---|
| 10,836,399 B2 * | 11/2020 | Kim | ...................... | B60W 40/02 |
| 2013/0325326 A1 * | 12/2013 | Blumenberg | .......... | G01C 21/36 701/428 |

(Continued)

FOREIGN PATENT DOCUMENTS

| | | | |
|---|---|---|---|
| JP | 2017-173286 A | 9/2017 | |
| WO | WO-2021168845 A1 * | 9/2021 | .......... G01C 21/343 |

OTHER PUBLICATIONS

WO2021168845_English (Year: 2025).*

*Primary Examiner* — Ramon A. Mercado
*Assistant Examiner* — Paul A Castro
(74) *Attorney, Agent, or Firm* — Rimon P.C.

(57) ABSTRACT

A vehicle includes a route calculation unit, an effectiveness storage, a second map acquiring unit, and a control unit. The route calculation unit calculates a route to a destination from navigation map information, based on destination information and position information of the vehicle. The effectiveness storage stores effectiveness information of driving assistance control or automatic driving control, for each route section of a navigation map. The control unit controls information to be acquired by the second map acquiring unit, based on the route to the destination and the effectiveness information for each route section of the route. The second map acquiring unit performs preliminary download of high-precision map information preferentially for a section included in the route calculated by the route calculation unit and stored in the effectiveness storage as a section in which effectiveness of the driving assistance control or the automatic driving control is low.

5 Claims, 11 Drawing Sheets

(51) Int. Cl.

| | |
|---|---|
| ***B60W 50/14*** | (2020.01) |
| ***G01C 21/00*** | (2006.01) |
| ***G01C 21/34*** | (2006.01) |

(52) U.S. Cl.
CPC ..... *G01C 21/3461* (2013.01); *G01C 21/3889* (2020.08); *B60W 2520/00* (2013.01); *B60W 2556/40* (2020.02)

(58) Field of Classification Search
CPC ......... B60W 60/0053; B60W 2556/45; B60W 60/0059; G01C 21/3461; G01C 21/3889
See application file for complete search history.

(56) References Cited

U.S. PATENT DOCUMENTS

| | | | | |
|---|---|---|---|---|
| 2021/0364306 | A1* | 11/2021 | Igarashi | G01C 21/367 |
| 2022/0221284 | A1* | 7/2022 | Chikamori | G01C 21/3415 |

* cited by examiner

| SECTION | EFFECTIVENESS |
|---|---|
| A | HIGH |
| B | HIGH |
| C | MODERATE |
| ⋮ | ⋮ |
| G | LOW |
| H | HIGH |
| I | HIGH |
| ⋮ | ⋮ |
| M | LOW |

VEHICLE

CROSS-REFERENCE TO RELATED APPLICATIONS

The present application claims priority from Japanese Patent Application No. 2022-035599 filed on Mar. 8, 2022, the entire contents of which are hereby incorporated by reference.

BACKGROUND

The disclosure relates to a vehicle.

Recent years have seen development of, as control using a high-precision map, driving assistance control that assists driving operations of a vehicle, or automatic driving control that automatically controls driving operations of a vehicle.

At present, in automatic driving at level 3 or higher approaching a practical stage, the driving assistance control or the automatic driving control is performed on the basis of the high-precision map, and route display, for example, is performed by using a navigation map in many cases.

Route display, for example, based on the navigation map is often performed in the following manner, as in existing techniques. Map information is provided from the navigation map stored in a storage inside a navigation apparatus, an optimum route to a destination is calculated, and the optimum route is displayed on the basis of a result of the calculation. Reference is made to Japanese Unexamined Patent Application Publication No. 2017-173286, for example.

SUMMARY

An aspect of the disclosure provides a vehicle including a first map storage, a position information detector, an information receiver, a route calculation unit, an effectiveness storage, a second map acquiring unit, a second map storage, and a control unit. The first map storage is configured to store navigation map information regarding a navigation map. The position information detector is configured to acquire position information of the vehicle. The information receiver is configured to accept information including destination information from a user of the vehicle. The route calculation unit is configured to calculate a route to a destination from the navigation map information, on the basis of the destination information and the position information of the vehicle. The effectiveness storage is configured to store effectiveness information of driving assistance control or automatic driving control, for each of predetermined route sections of the navigation map. The second map acquiring unit is configured to download high-precision map information. The second map storage is configured to store the downloaded high-precision map information. The control unit is configured to control information to be acquired by the second map acquiring unit, on the basis of the route to the destination and the effectiveness information for each of the route sections of the route. The second map acquiring unit is configured to perform preliminary download of the high-precision map information preferentially for a section included in the route calculated by the route calculation unit and stored in the effectiveness storage as a section in which effectiveness of the driving assistance control or the automatic driving control is low.

An aspect of the disclosure provides a vehicle including a first map storage, a second map storage, an effectiveness storage, a position information detector, an information receiver, and circuitry. The first map storage is configured to store navigation map information regarding a navigation map. The second map storage is configured to store high-precision map information. The effectiveness storage is configured to store effectiveness information of driving assistance control or automatic driving control, for each of predetermined route sections of the navigation map. The position information detector is configured to acquire position information of the vehicle. The information receiver is configured to accept information including destination information from a user of the vehicle. The circuitry is configured to calculate a route to a destination from the navigation map information, on the basis of the destination information and the position information of the vehicle. The circuitry is configured to download and store the high-precision map information in the second map storage. The circuitry is configured to control the high-precision map information to be downloaded, on the basis of the route to the destination and the effectiveness information for each of the route sections of the route. The circuitry is configured to perform preliminary download of the high-precision map information preferentially for a section included in the calculated route and stored in the effectiveness storage as a section in which effectiveness of the driving assistance control or the automatic driving control is low.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
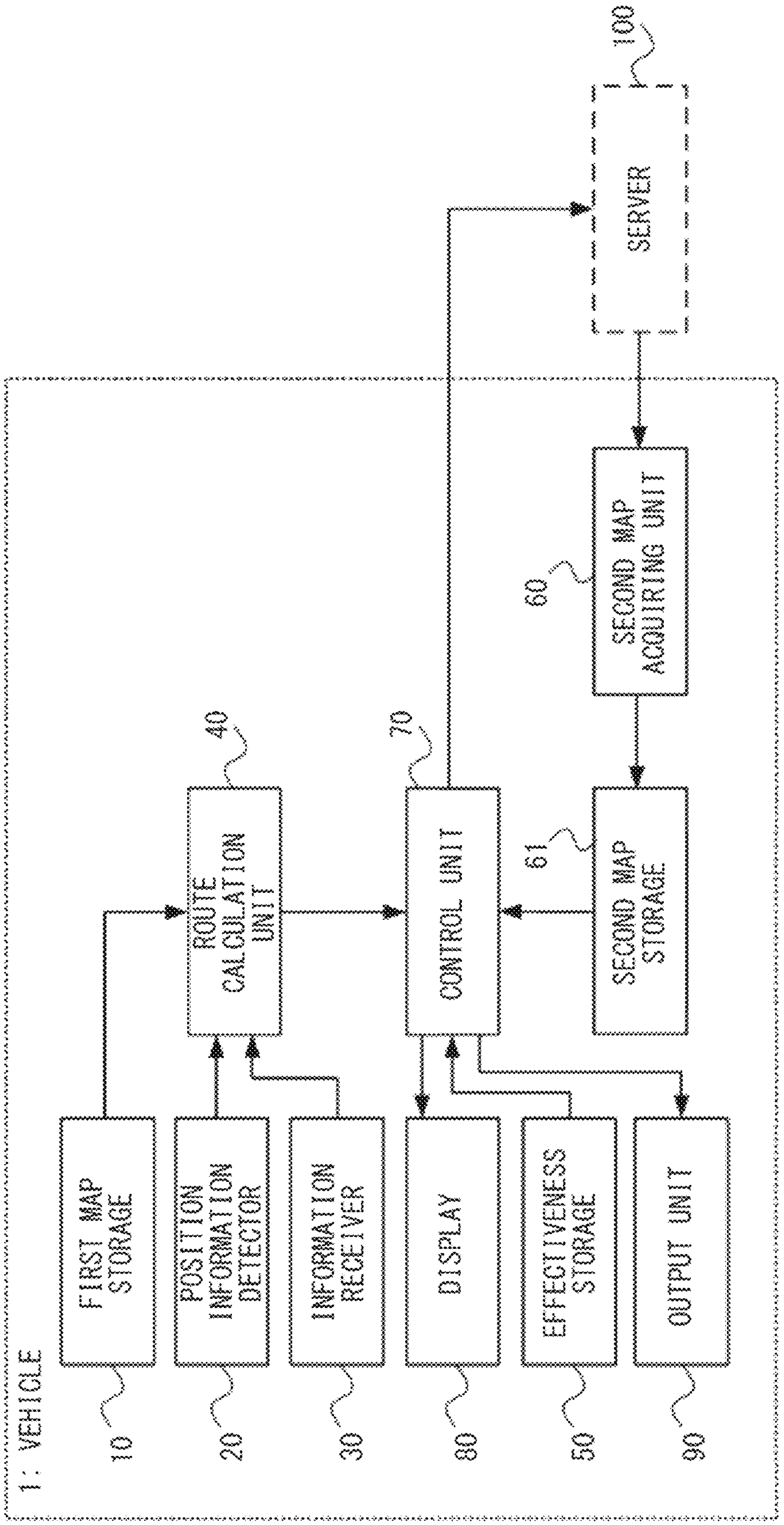
FIG. 1 is a diagram illustrating a configuration of a vehicle according to one example embodiment of the disclosure.

A high-precision map to be used to perform driving assistance control or automatic driving control often has a large data volume and takes time for download, as compared with a navigation map. In addition, in a case of continuously performing download of the high-precision map while a vehicle is traveling, the download can take time or can be interrupted due to instability of communication. This makes it difficult to sufficiently download data of the high-precision map, which results in shortage of information, making it difficult to continue the driving assistance control or the automatic driving control.

It is desirable to provide a vehicle that preferentially downloads, regarding a section included in a traveling route to a destination and preliminarily stored as a section in which acquisition of high-precision map information to be used for driving assistance control or automatic driving control takes time or download thereof is interrupted, the high-precision map information of the section and/or a section preceding or subsequent to the section.

In the following, some example embodiments of the disclosure are described in detail with reference to FIGS. 1 to 11. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A vehicle 1 according to a first example embodiment will now be described with reference to FIGS. 1 to 7.

[Configuration of Vehicle 1]

As illustrated in FIG. 1, the vehicle 1 according to the example embodiment may include a first map storage 10, a position information detector 20, an information receiver 30, a route calculation unit 40, an effectiveness storage 50, a second map acquiring unit 60, a second map storage 61, a control unit 70, a display 80, and an output unit 90.

The first map storage 10 stores navigation map information regarding a navigation map serving as a first map.

In one example, the first map storage 10 may include a hard disk device and a semiconductor memory. The first map storage 10 may store, for example, map information to be used for navigation such as route calculation or facility calculation.

The navigation map information stored in the first map storage 10 may be read by the route calculation unit 40 to be described later.

The position information detector 20 may include, for example, a GPS receiver, an azimuth sensor, and a range sensor. The position information detector 20 may acquire information on the position (e.g., the latitude and longitude) of the vehicle 1 serving as an own vehicle at a predetermined timing, to thereby acquire position information of the own vehicle.

The position information of the own vehicle acquired by the position information detector 20 may be outputted to the route calculation unit 40 to be described later.

The information receiver 30 accepts information including destination information from a user.

Examples of the information receiver 30 may include a touch panel disposed in the front of the vehicle 1. By receiving a touch operation on the touch panel performed by the user, the information receiver 30 may accept, for example, information to be used for the route calculation, including the destination information, waypoint information, a route calculation instruction, and a toll road priority instruction.

The route calculation unit 40 calculates a route to a destination from the navigation map information, on the basis of the destination information received from the user via the information receiver 30 and the position information of the own vehicle acquired by the position information detector 20.

The route calculation unit 40 may, for example, present multiple candidate routes, allowing the user to select and determine any route. Information on the route thus selected and determined may be outputted to the control unit 70 to be described later.

The effectiveness storage 50 stores effectiveness information of driving assistance control or automatic driving control, for each predetermined route section of the navigation map.

In one example, the effectiveness storage 50 may include a hard disk device and a semiconductor memory. The effectiveness storage 50 may preliminarily hold information on a place having a communication issue, for each route section. Examples of the place having a communication issue may include a tunnel, an urban area having many high buildings, a suburban area such as a mountainous region where a communication line is easily disconnected and that exhibits weak relaying ability, and a place under a situation in which download data has a very large volume and takes time for download. The effectiveness storage 50 may store the information by regarding a place under a weak communication environment as a section with low effectiveness, and regarding a place where a communication issue is unlikely to occur as a section with high effectiveness.

The effectiveness information stored in the effectiveness storage 50 may be outputted to the control unit 70 to be described later.

The second map acquiring unit 60 downloads high-precision map information regarding a high-precision map serving as a second map.

In one example, the second map acquiring unit 60 may acquire the high-precision map information to be used for the driving assistance control or the automatic driving control and designated by the control unit 70 to be described later, for example, from a server 100.

The information acquired by the second map acquiring unit 60 may be outputted to the second map storage 61 to be described later.

The second map storage 61 stores the downloaded high-precision map information serving as second map information.

In one example, the second map storage 61 may include a hard disk device and a semiconductor memory, and may store the high-precision map information to be used for the driving assistance control or the automatic driving control.

The high-precision map information stored in the second map storage 61 may be read by the control unit 70 to be described later.

The control unit 70 controls the information to be acquired by the second map acquiring unit 60, on the basis of the route to the destination, and the effectiveness information for each route section thereof.

In one example, the control unit 70 may control for which route section the second map acquiring unit 60 preferentially downloads the high-precision map information to be used for the driving assistance control or the automatic driving control, for example, from the server 100, on the basis of information on the route section determined by the route calculation unit 40, and the effectiveness information stored in the effectiveness storage 50.

The preferential download may be performed by, for example, two methods of a cumulative method and a batch method. The cumulative method may be a method of finding spare time of download, and downloading and accumulating the high-precision map information of a priority section little by little. The batch method may be a method of collectively downloading multiple sections preliminarily, to gain download time for the priority section, and collectively performing download of the high-precision map information of the priority section.

The display 80 may include, for example, a liquid crystal panel. The display 80 may display the route to the destination calculated by the route calculation unit 40 to be viewable by the user.

The output unit 90 may output the high-precision map information acquired from the control unit 70 to an electronic control unit (ECU) for the driving assistance control or the automatic driving control. This allows the driving assistance control or the automatic driving control to be executed.

[Processing Performed by Vehicle 1]

Processing performed by the vehicle 1 according to the example embodiment will now be described with reference to FIG. 2.

Figure 2:
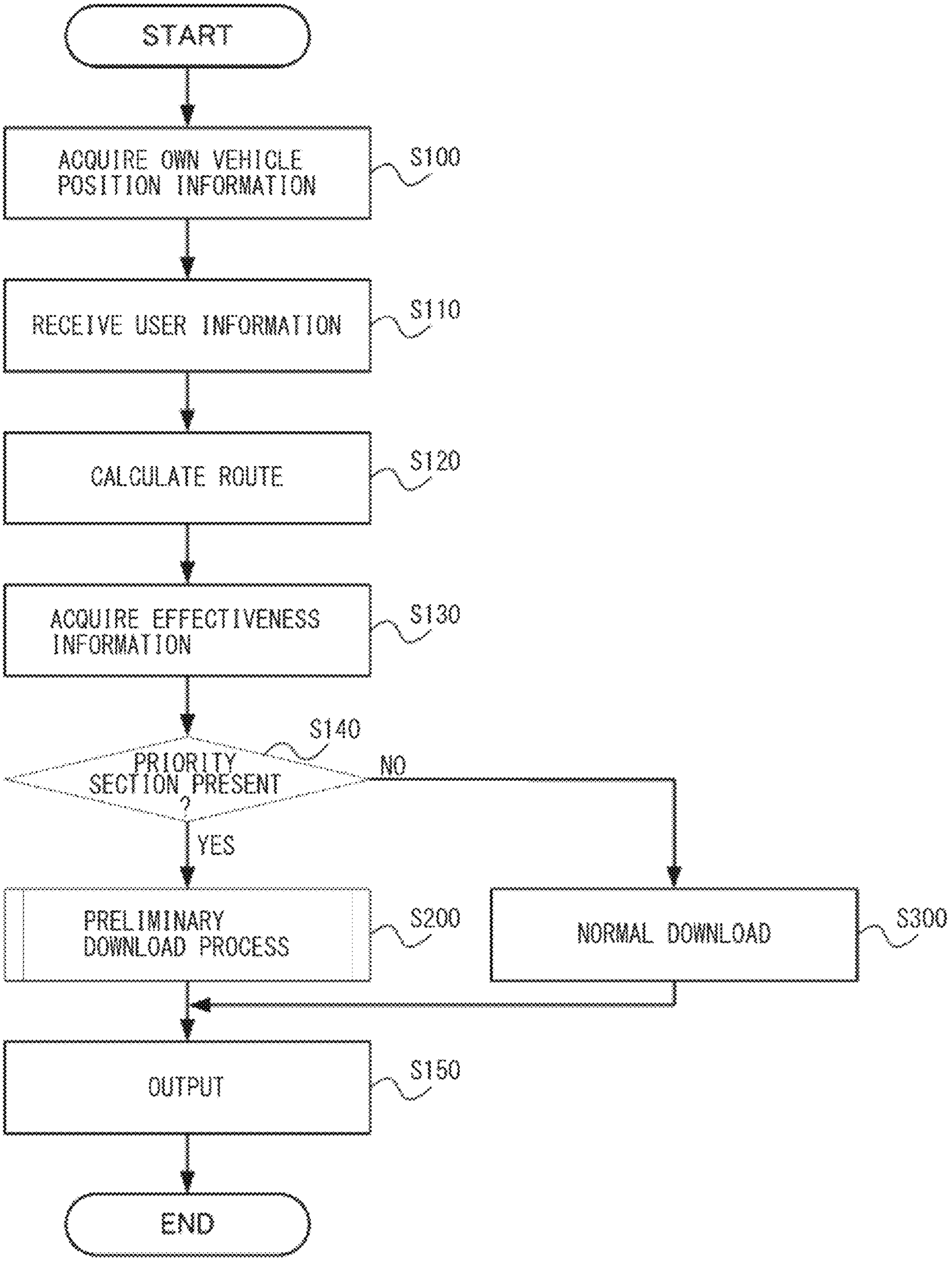
FIG. 2 is a flowchart illustrating processing performed by the vehicle according to one example embodiment of the disclosure.

As illustrated in FIG. 2, the position information detector 20 may acquire the position information of the own vehicle (step S100).

The information receiver 30 may accept information including the destination information from the user (step S110).

The route calculation unit 40 may calculate the route to the destination from the navigation map information stored in the first map storage 10, on the basis of the destination information received from the user via the information receiver 30, the position information of the own vehicle received from the position information detector 20, and other supplementary information (step S120).

The control unit 70 may acquire, on the basis of the route to the destination calculated by the route calculation unit 40, the effectiveness information of each section of the route stored in the effectiveness storage 50 (step S130).

On the basis of the route to the destination and the effectiveness information of each section, the control unit 70 may determine presence or absence of a priority section for which the high-precision map information serving as the second map information is to be preliminarily downloaded from the server 100 (step S140).

If a priority section is present in the route to the destination ("YES" in step S140), the second map acquiring unit 60 may execute a process of preliminarily downloading the high-precision map information (step S200).

If a priority section is absent in the route to the destination ("NO" in step S140), the second map acquiring unit 60 may, in a normal way, download the high-precision map information in the order of the route to the destination (step S300).

The output unit 90 may output the high-precision map information received from the control unit 70 to the ECU (step S150). This allows the driving assistance control or the automatic driving control to be executed.

[High-Precision Map Preliminary Download Process Using Cumulative Method]

A description will now be given of a high-precision map preliminary download process (step S200) performed using the cumulative method by the vehicle 1 according to the example embodiment, with reference to FIGS. 3 to 5.

Figure 4:
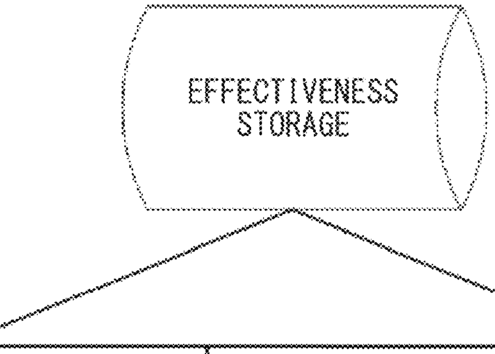
FIG. 4 is a diagram illustrating an example of data stored in an effectiveness storage included in the configuration according to one example embodiment of the disclosure.

FIG. 4 illustrates that, in the effectiveness storage 50, the effectiveness information is stored for each route section of the navigation map serving as the first map. A section G and a section M may each be regarded as a section in which communication hindrance is predicted, and stored as a section with low effectiveness. A section A and a section B may each be regarded as a section free from a communication issue, and stored as a section with high effectiveness.

The section in which communication hindrance is predicted may refer to a place having a communication issue. Examples of the place having a communication issue may include a place where a communication line is easily disconnected, like a tunnel, an urban area having high buildings, or a suburban area such as a mountainous region exhibiting weak relaying ability, and an area where vehicle traffic is heavy and communication is concentrated.

Figure 5:
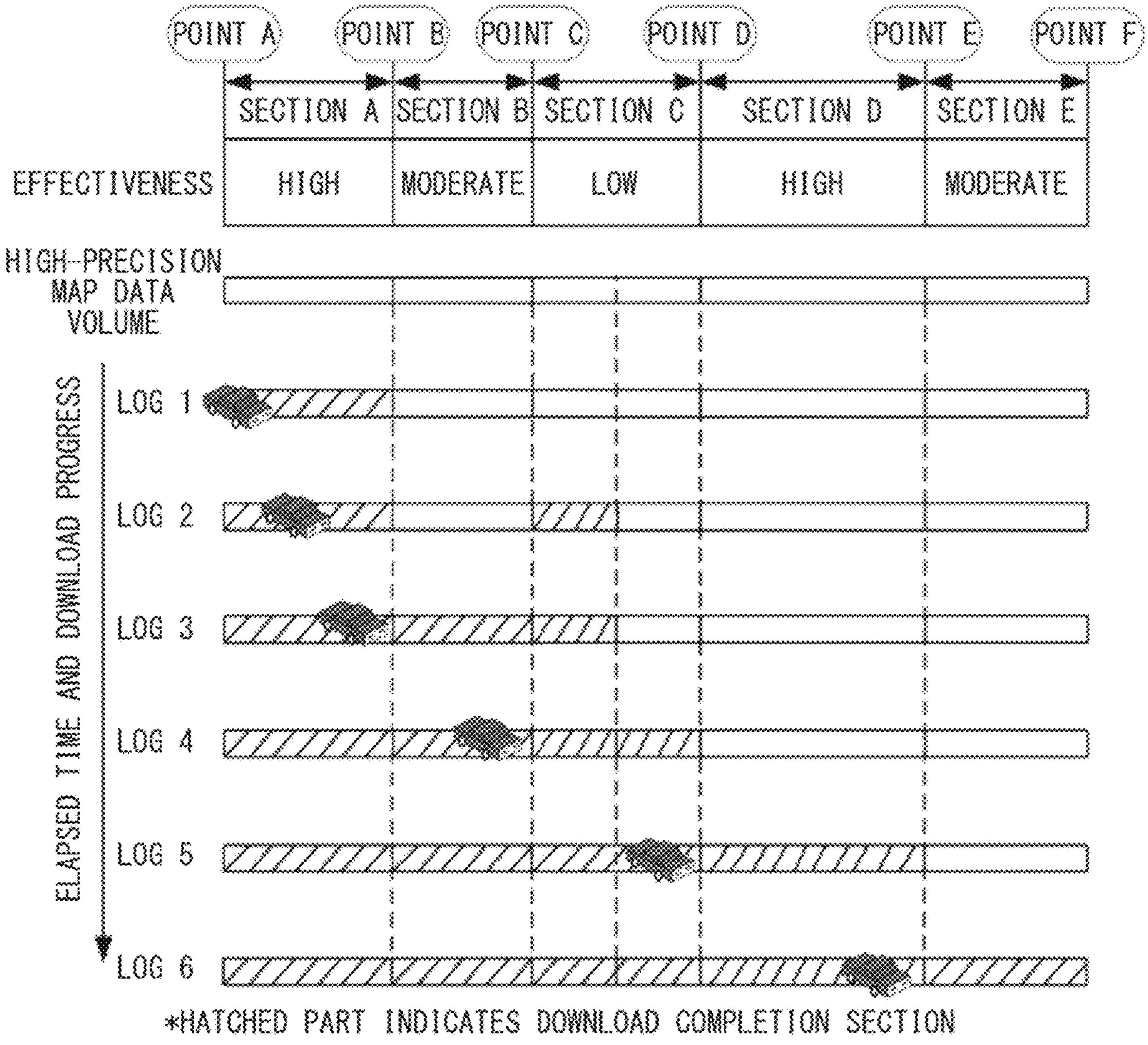
FIG. 5 is a diagram illustrating an example of progress of the download process according to one example embodiment of the disclosure.

FIG. 5 illustrates an example of how download progresses, in the preliminary download process described above (step S200), by illustrating a travel time of the vehicle 1 and the high-precision map information together with elapse of time and a travel distance. A data volume of the high-precision map for each section is represented by a bar chart. Progress of the high-precision map information downloaded in the order of logs 1 to 6 is represented by a bar chart. A hatched part indicates that download has been completed. A vehicle icon represents a travel position of the vehicle 1. Although this drawing illustrates the data volume of the high-precision map depending on a distance of the section, the actual data volume of the high-precision map is not necessarily large for a long distance and small for a short distance. In a case where the section includes a large amount or number of object information on an object such as a building, actual features including a lane line, a traffic light, and a continuous curve section, or virtual features present in a space based on, for example, a geographic information system (GIS), the amount of the high-precision map information may also be large.

The following description is given taking FIG. 5 as an example.

Figure 3:
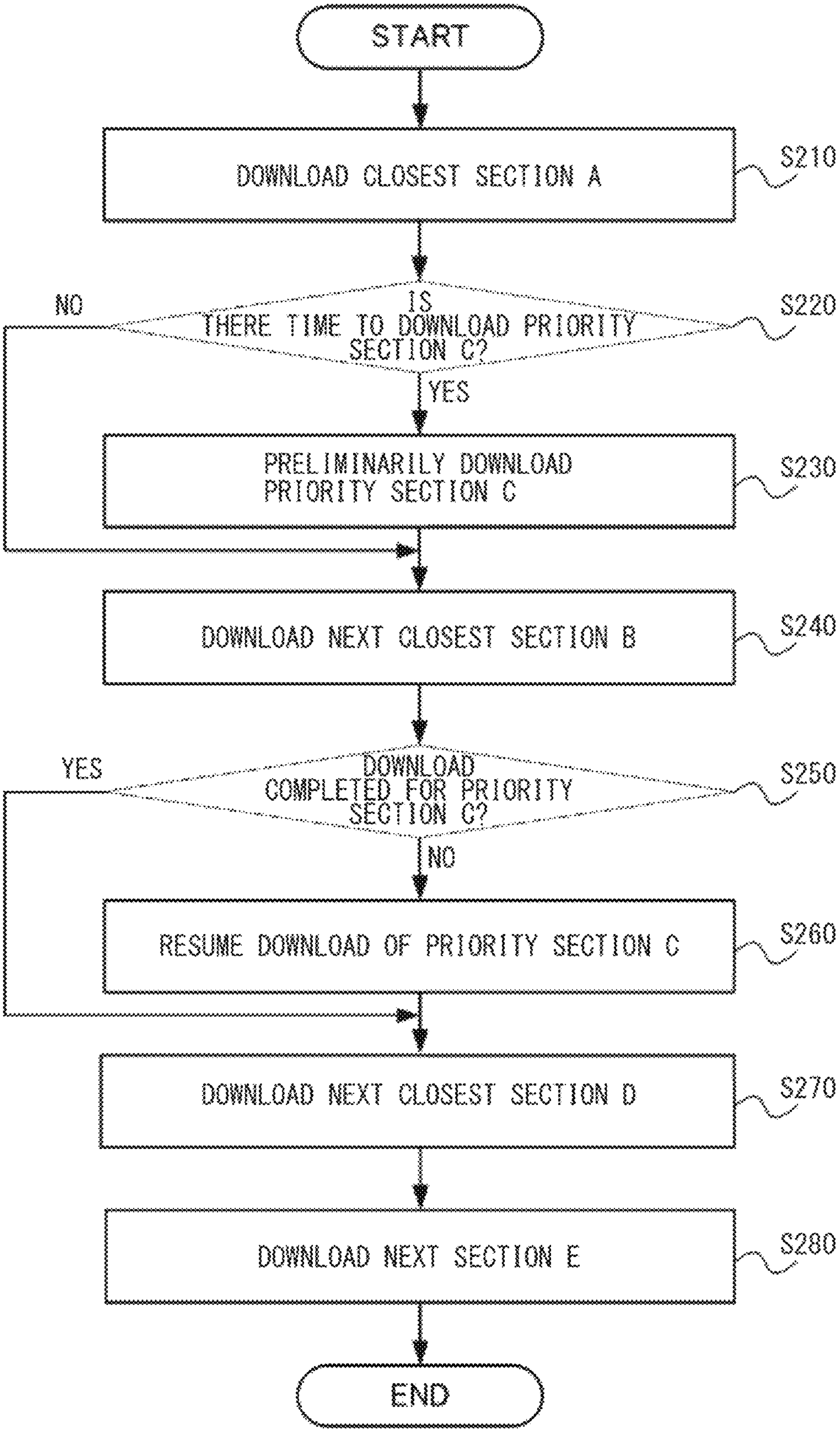
FIG. 3 is a flowchart illustrating a download process according to one example embodiment of the disclosure.

As illustrated in FIG. 3, the control unit 70 may first cause the second map acquiring unit 60 to download the high-precision map information for the closest route section A in step S210 (log 1 in FIG. 5).

Next, the control unit 70 may determine whether there is time to download the high-precision map information of a priority section C in step S220. At the time when the high-precision map information desired for continuation of the driving assistance control or the automatic driving control of the vehicle 1 in the closest section A is downloaded, in a case where there is spare time before downloading the high-precision map information of the next closest section B, the control unit 70 may determine that there is time to download the high-precision map information of the priority section C ("YES" in step S220). In this case, the control unit 70 may cause the second map acquiring unit 60 to start preliminary download of the high-precision map information of the priority section C in step S230 (log 2 in FIG. 5).

Thereafter, when the vehicle 1 approaches the end of the section A for which download of the high-precision map information sufficient for continuation of the driving assistance control or the automatic driving control has been completed, the control unit 70 may cause the second map acquiring unit 60 to temporarily stop the preliminary download of the priority section C, and to download the high-precision map information of the closest section B in step S240 (log 3 in FIG. 5).

In contrast, at the time when the high-precision map information desired for continuation of the driving assistance control or the automatic driving control of the vehicle 1 in the section A is downloaded, in a case where there is no spare time before downloading the high-precision map information of the next closest section B, the control unit 70 may determine that there is no time to download the high-precision map information of the priority section C ("NO" in step S220). In this case, the control unit 70 may cause the second map acquiring unit 60 to download the high-precision map information of the closest section B, without starting the preliminary download of the high-precision map information of the priority section C, in step S240.

Thereafter, at the time when the high-precision map information desired for continuation of the driving assistance control or the automatic driving control of the vehicle 1 in the closest section B is downloaded, the control unit 70 may determine whether the preliminary download of the priority section C has been completed in step S250.

If the preliminary download of the priority section C has been completed ("YES" in step S250), the control unit 70 may cause the second map acquiring unit 60 to download the high-precision map information of the next closest section D in step S270 (log 5 in FIG. 5). Upon completion of the download, the control unit 70 may cause the second map acquiring unit 60 to download the further next closest section E in step S280 (log 6 in FIG. 5).

At the time when the high-precision map information desired for continuation of the driving assistance control or the automatic driving control of the vehicle 1 in the closest section B is downloaded, if the preliminary download of the priority section C has not been completed ("NO" in step S250), the control unit 70 may cause the second map acquiring unit 60 to resume the preliminary download of the priority section C in step S260 (log 4 in FIG. 5).

Thereafter, the control unit 70 may cause the second map acquiring unit 60 to download the next closest section D in step S270 (log 5 in FIG. 5). Upon completion of the download, the control unit 70 may cause the second map acquiring unit 60 to download the further next closest section E in step S280 (log 6 in FIG. 5).

[High-Precision Map Preliminary Download Process Using Batch Method]

A description will now be given of the high-precision map preliminary download process (step S200) performed using the batch method, with reference to FIGS. 6 and 7.

Figure 7:
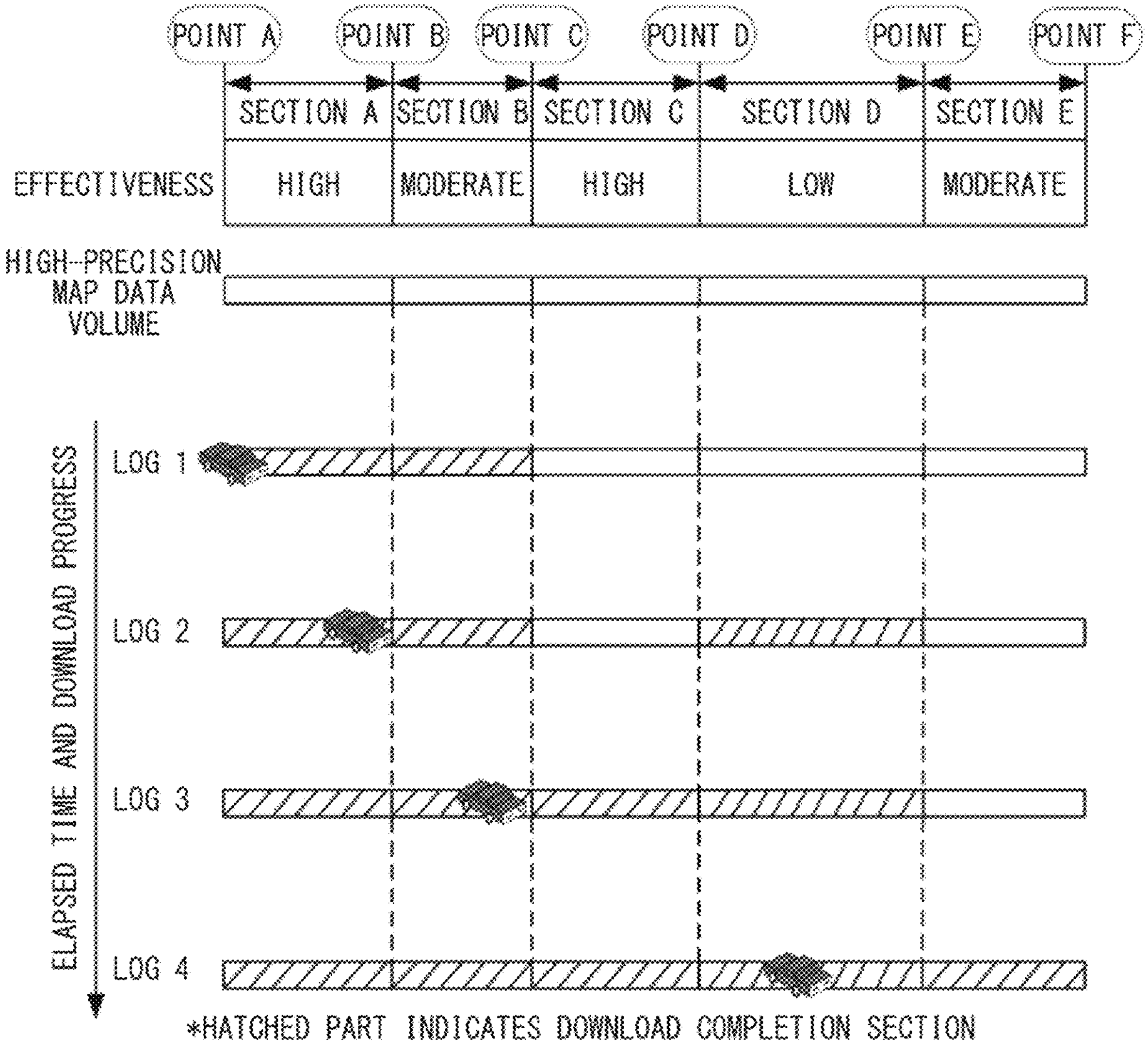
FIG. 7 is a diagram illustrating an example of progress of the download process according to one example embodiment of the disclosure.

As with FIG. 5, FIG. 7 illustrates an example of how download progresses, in the preliminary download process (step S200), by illustrating a travel time of the vehicle 1 and the high-precision map information together with elapse of time and a travel distance. A data volume of the high-precision map for each section is represented by a bar chart. Progress of the high-precision map information downloaded in the order of logs 1 to 4 is represented by a bar chart. A hatched part indicates that download has been completed. A vehicle icon represents a travel position of the vehicle 1. Although this drawing illustrates the data volume of the high-precision map depending on a distance of the section, the actual data volume of the high-precision map is not necessarily large for a long distance and small for a short distance. In a case where the section includes a large amount of object information on an object such as a building, the amount of the high-precision map information may also be large.

The following description is given taking FIG. 7 as an example.

Figure 6:
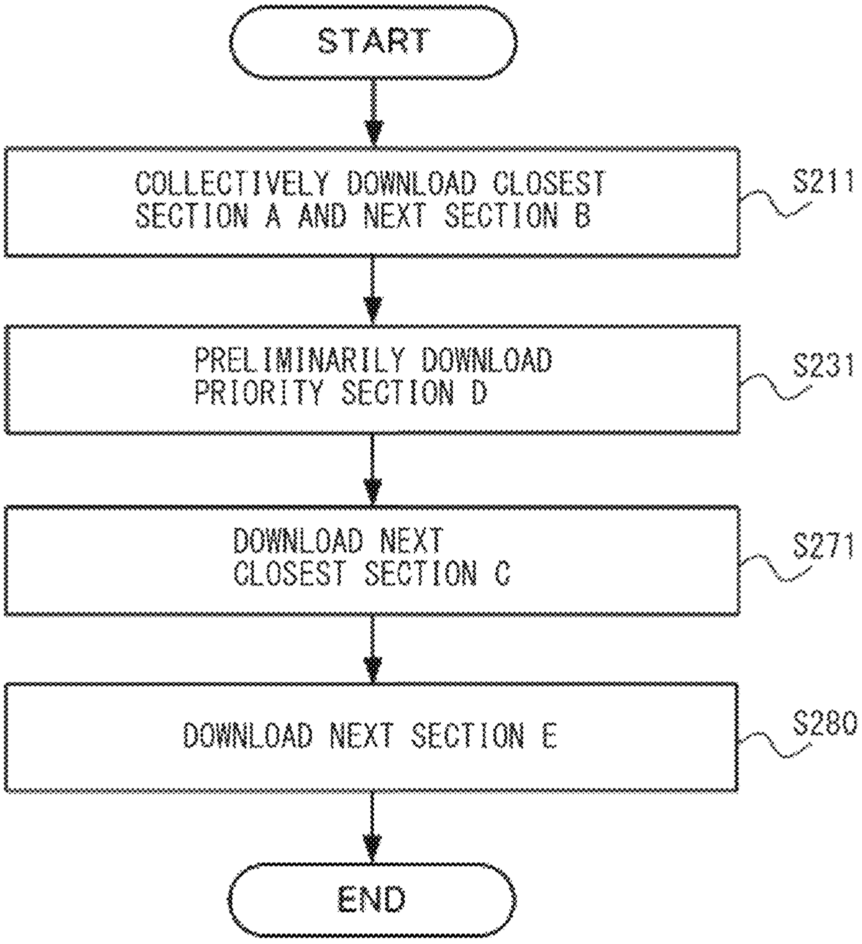
FIG. 6 is a flowchart illustrating a download process according to one example embodiment of the disclosure.

As illustrated in FIG. 6, in a case where a priority section is present in the route to the destination, the control unit 70 may first determine an amount of the high-precision map information of the priority section and time desired for preliminary download thereof. To gain time for preliminarily downloading the priority section in a collective manner before the vehicle 1 travels to reach the priority section, the control unit 70 may cause the second map acquiring unit 60 to collectively download multiple sections of a section A closest to the current vehicle position and the next section B in step S211 (log 1 in FIG. 7). How many multiple sections are to be collectively downloaded may be determined depending on a minimum section length that allows the time for preliminarily downloading the priority section to be gained, which is determined on the basis of a position of the priority section in a traveling route and an expected arrival time of the vehicle 1.

After time for preliminarily downloading a priority section D is gained by collectively downloading the high-precision map information of the multiple sections, the control unit 70 may cause the second map acquiring unit 60 to preliminarily download the priority section D in a collective manner in step S231 (log 2 in FIG. 7).

Upon completion of the preliminary download of the priority section D, the control unit 70 may cause the second map acquiring unit 60 to download the high-precision map information of the next closest route section C in step S271 (log 2 in FIG. 7). Upon completion of the download, the control unit 70 may cause the second map acquiring unit 60 to download the further next closest section E in step S280, because the priority section D has been preliminarily downloaded (log 4 in FIG. 7).

[Modification Example]

The high-precision map preliminary download process (step S200) may also be performed by a method described below.

For example, although log 3 in FIG. 5 illustrates an example in which the high-precision map information of the section B is downloaded to the end, the control unit 70 may cause the second map acquiring unit 60 to temporarily stop the download of the section B midway through the download, in a case where the temporary stop does not hinder the driving assistance control or the automatic driving control. The control unit 70 may cause the second map acquiring unit 60 to download the priority section C by the preliminary download using the cumulative method. Thereafter, the control unit 70 may cause the second map acquiring unit 60 to resume the temporarily stopped download of the section B.

[Working and Effects]

As described above, the control unit 70 of the vehicle 1 according to the example embodiment performs control to cause the second map acquiring unit 60 to preliminarily download the high-precision map information preferentially for a section stored as a section in which effectiveness of the driving assistance control or the automatic driving control is low, on the basis of the route sections to the destination calculated by the route calculation unit 40, and the effectiveness information corresponding to each route section stored in the effectiveness storage 50.

The preliminary download may be performed by, for example, two methods of the cumulative method and the batch method. The cumulative method may find spare time of download, and download the high-precision map information of a priority section little by little. The batch method may collectively download multiple sections preliminarily, to gain download time for the priority section, and perform download of the high-precision map information of the priority section. The download may be performed by the suitable method, depending on at which position in the traveling route the section to be preferentially downloaded is present.

This makes it possible to, for the section included in the traveling route to the destination and stored as the section in which the effectiveness of the driving assistance control or the automatic driving control is low, preferentially download the high-precision map information of the section, thereby allowing the driving assistance control or the automatic driving control to be continued.

In the vehicle 1 according to the example embodiment, a section in which communication hindrance is predicted may be stored as the section in which the effectiveness of the driving assistance control or the automatic driving control is low.

The section in which communication hindrance is predicted may refer to, for example, a place having a communication issue because a communication line is easily disconnected, like a tunnel, an urban area having high buildings, or a suburban area such as a mountainous region exhibiting weak relaying ability. In such a section in which communication hindrance is predicted, it is assumed that download is interrupted due to disconnected communication during download of the high-precision map information, or that the high-precision map information takes time for download because a communication line is crowded. The high-precision map information to be used for the driving assistance control or the automatic driving control has a large data volume. Therefore, if the download is interrupted due to disconnected communication, or the download takes time, it becomes difficult to continue the driving assistance control or the automatic driving control.

Thus, in the traveling route to the destination, for a section in which it takes time to acquire the high-precision map information to be used for the driving assistance control or the automatic driving control due to communication hindrance, it is possible to preferentially download the high-precision map information of the section. This increases the possibility of the driving assistance control or the automatic driving control being continued.

Second Example Embodiment

A vehicle 1A according to a second example embodiment will now be described with reference to FIGS. 8 to 11.

[Configuration of Vehicle 1A]

Figure 8:
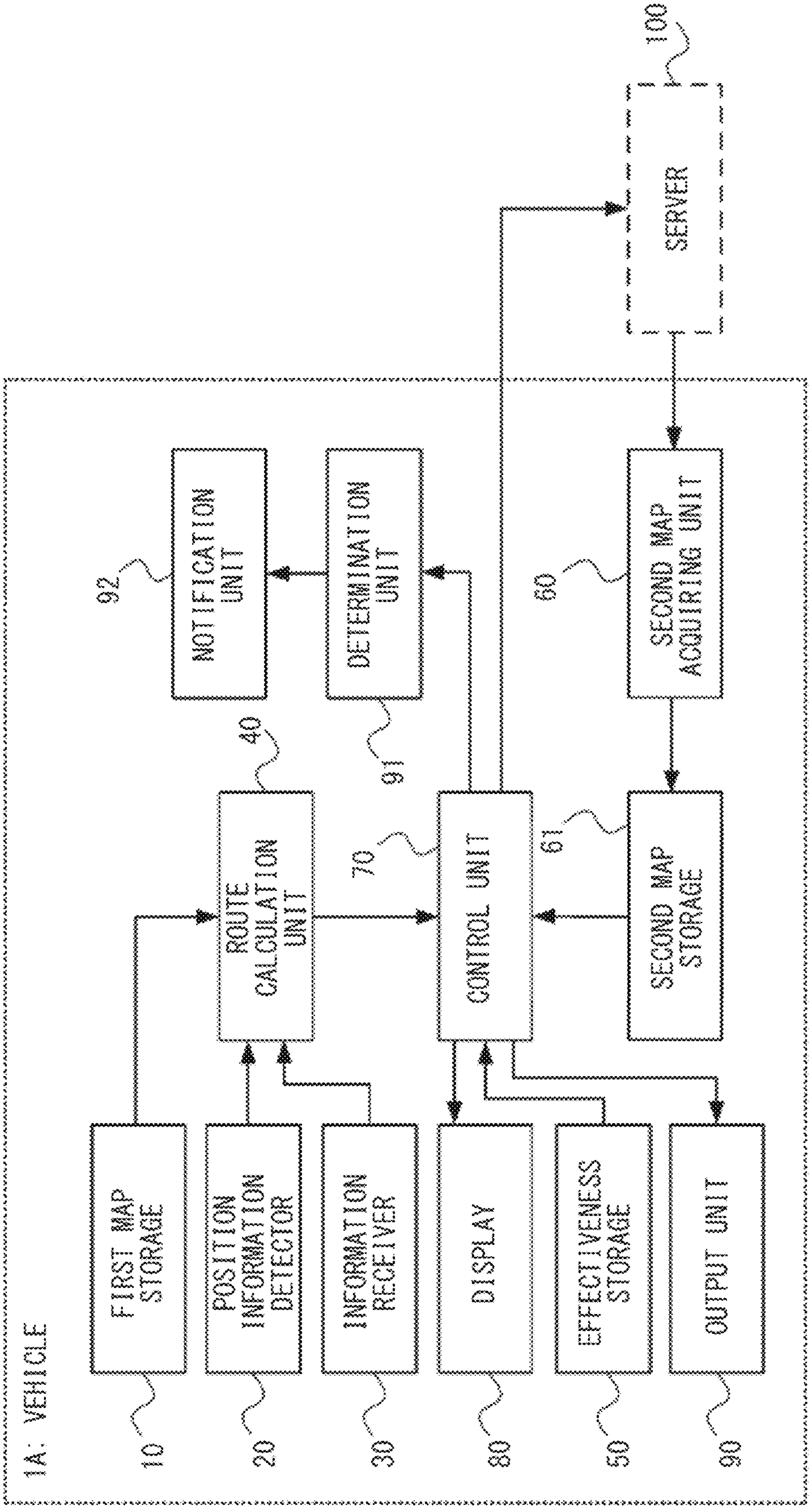
FIG. 8 is a diagram illustrating a configuration of a vehicle according to one example embodiment of the disclosure.

As illustrated in FIG. 8, the vehicle 1A according to the example embodiment may include the first map storage 10, the position information detector 20, the information receiver 30, the route calculation unit 40, the effectiveness storage 50, the second map acquiring unit 60, the second map storage 61, the control unit 70, the display 80, the output unit 90, a determination unit 91, and a notification unit 92.

Note that components having configurations similar to those of the components in the first example embodiment are denoted with the same reference numerals without redundant description.

The determination unit 91 may determine whether the driving assistance control or the automatic driving control is continuable in a section for which the second map acquiring unit 60 has preferentially downloaded the high-precision map information.

In one example, the determination unit 91 may determine whether the high-precision map information sufficient to perform the driving assistance control or the automatic driving control has been downloaded in the section for which the second map acquiring unit 60 has preferentially downloaded the high-precision map information.

In a case where the determination unit 91 determines that the driving assistance control or the automatic driving control is not continuable, the determination unit 91 may output a result of the determination to the notification unit 92 to be described later.

The notification unit 92 may notify the user or an occupant of the possibility of the driving assistance control or the automatic driving control being canceled.

In one example, in a case where the determination unit 91 determines that the driving assistance control or the automatic driving control is not continuable, the notification unit 92 may notify the user or occupant of the possibility of the driving assistance control or the automatic driving control being canceled in the route calculated by the route calculation unit 40, for example, by displaying such information on the liquid crystal panel of the display 80.

[Processing Performed by Vehicle 1A]

Processing performed by the vehicle 1A according to the example embodiment will now be described with reference to FIGS. 8 to 11.

Figure 11:
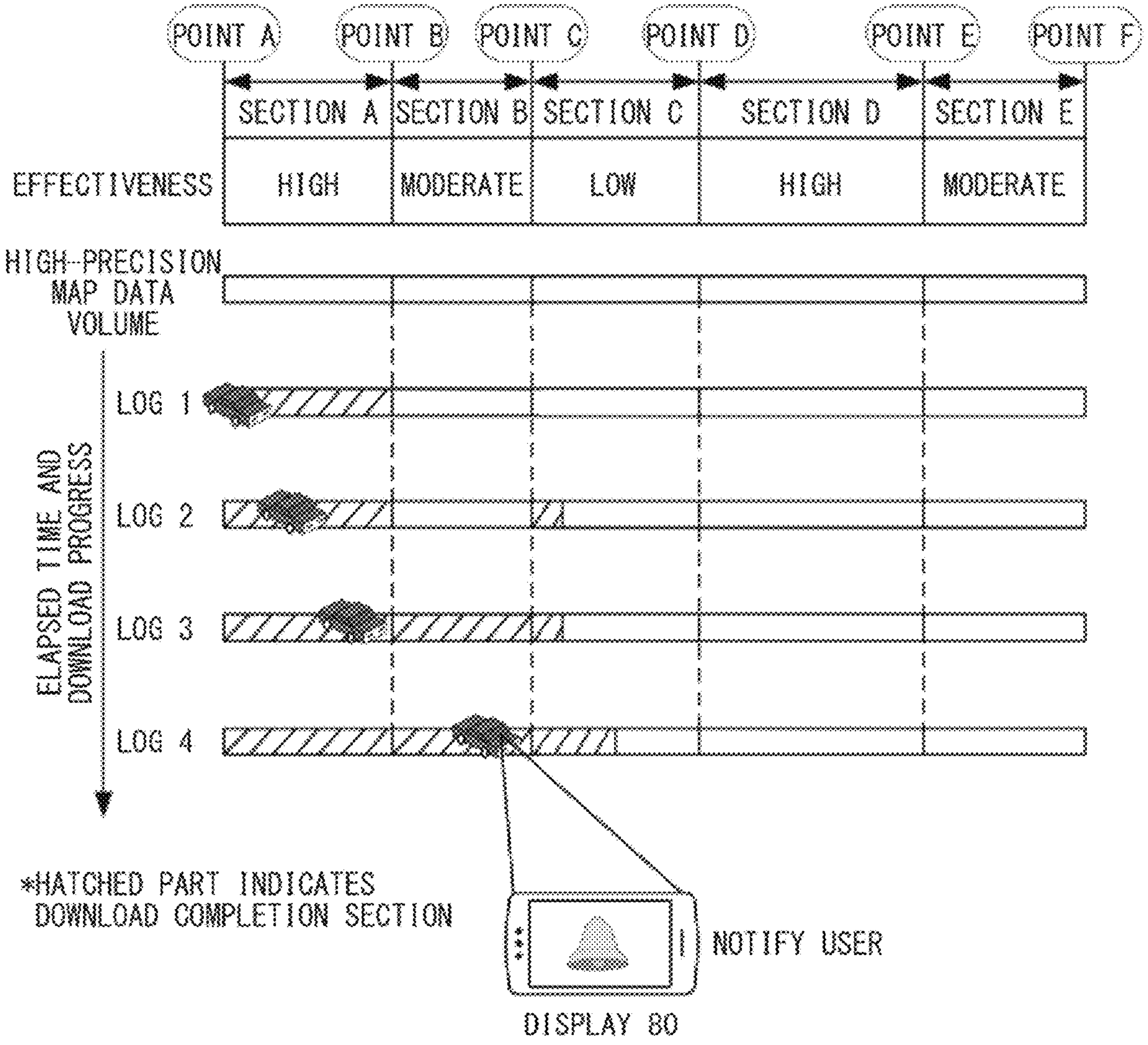
FIG. 11 is a diagram illustrating an example of progress of a download process according to one example embodiment of the disclosure.

FIG. 11 illustrates an example of how download progresses, in the preliminary download process (step S200), by illustrating a travel time of the vehicle 1A and the high-precision map information together with elapse of time and a travel distance. A data volume of the high-precision map for each section is represented by a bar chart. Progress of the high-precision map information downloaded in the order of logs 1 to 4 is represented by a bar chart. A hatched part indicates that download has been completed. A vehicle icon represents a travel position of the vehicle 1A. Although this drawing illustrates the data volume of the high-precision map depending on a distance of the section, the actual data volume of the high-precision map is not necessarily large for a long distance and small for a short distance. In a case where the section includes a large amount of object information on an object such as a building, the amount of the high-precision map information may also be large.

The following description is given taking FIG. 11 as an example.

Figure 10:
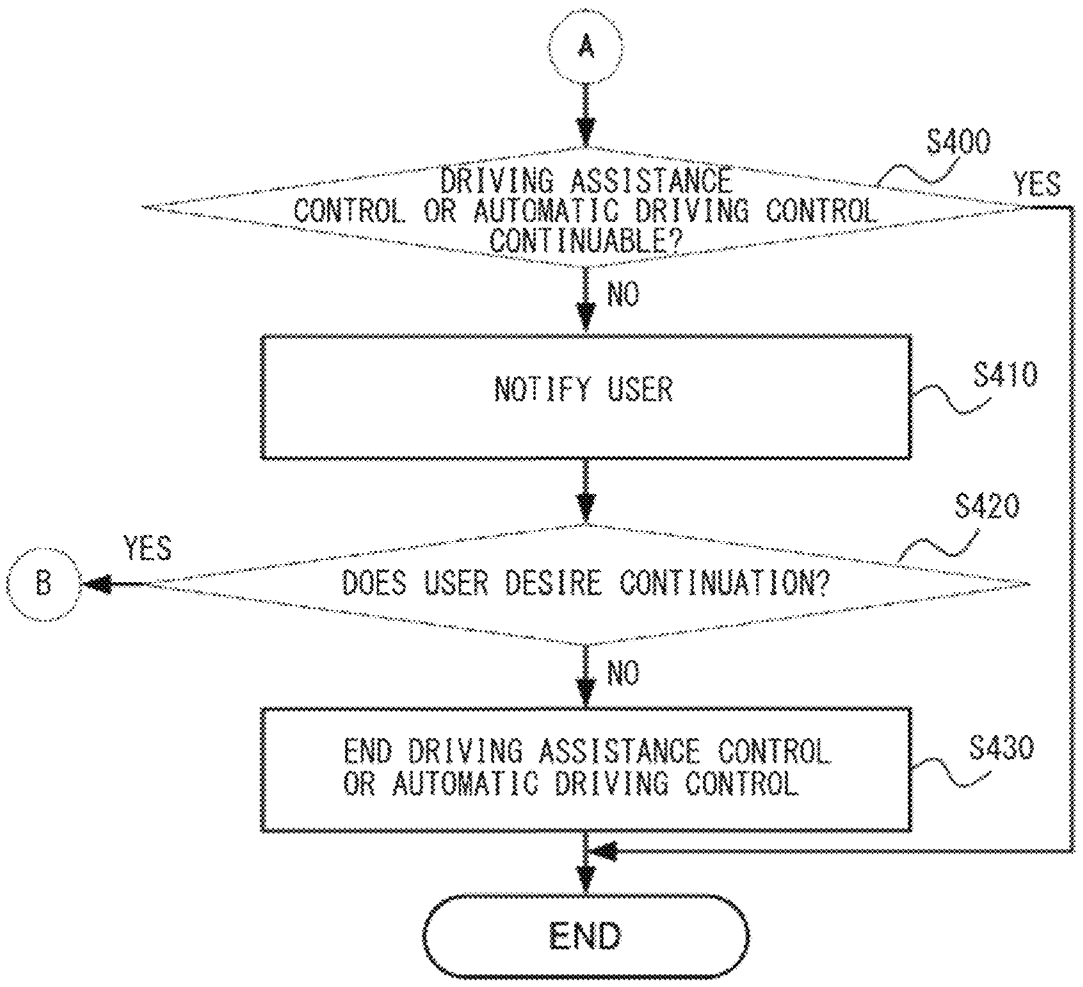
FIG. 10 is a flowchart illustrating the processing performed by the vehicle according to one example embodiment of the disclosure.

In FIG. 10, the determination unit 91 may determine whether the driving assistance control or the automatic driving control is continuable in a priority section C for which the high-precision map information has been preliminary downloaded, out of the route sections to the destination, in step S400. If the driving assistance control or the automatic driving control is continuable ("YES" in step S400), the driving assistance control or the automatic driving control may be executed continuously up to the destination.

If the high-precision map information sufficient to perform the driving assistance control or the automatic driving control has not been downloaded, for example, and the driving assistance control or the automatic driving control is not continuable ("NO" in step S400), the notification unit 92 may notify the user of the possibility of the driving assistance control or the automatic driving control being canceled in the route currently calculated by the route calculation unit 40 in step S410 (log 4 in FIG. 11). The notification to the user may be provided by, for example, being displayed on the liquid crystal panel serving as the display 80. Note that the notification may be provided by LED display or sound in a cockpit.

Figure 9:
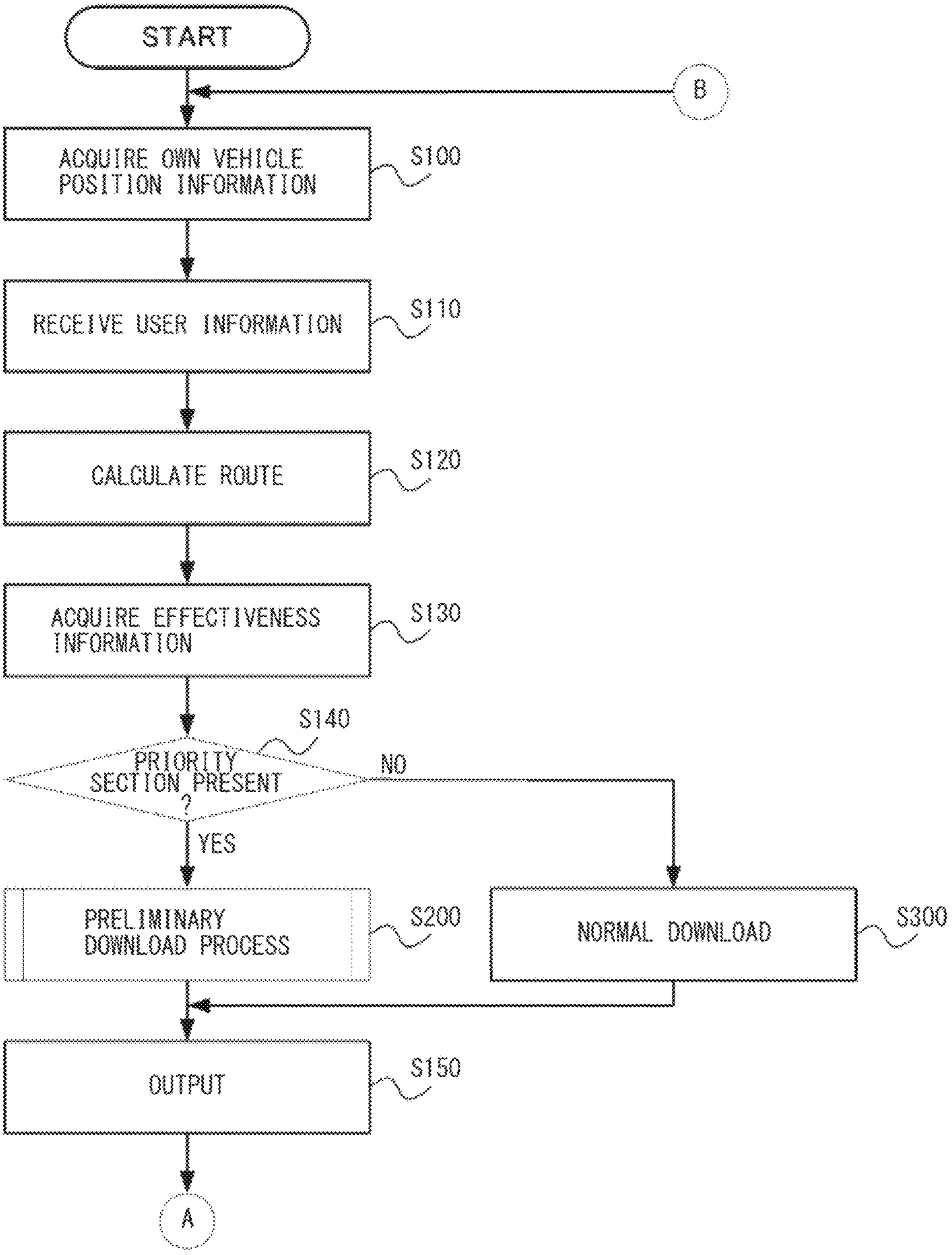
FIG. 9 is a flowchart illustrating processing performed by the vehicle according to one example embodiment of the disclosure.

Next, the control unit 70 may determine whether the user notified of the possibility of the driving assistance control or the automatic driving control being canceled desires continuation of the driving assistance control or the automatic driving control in step S420. If the user notified of the possibility of the driving assistance control or the automatic driving control being canceled desires continuation of the driving assistance control or the automatic driving control ("YES" in step S420), as illustrated in FIG. 9, the position information detector 20 may acquire the current position information of the vehicle 1A serving as the own vehicle again in step S100, and the information receiver 30 may receive information including the destination information again in step S110, in order to calculate a route different from the current route. The route calculation unit 40 may re-calculate a new route to the destination that allow for execution of the driving assistance control or the automatic driving control, from the navigation map information stored in the first map storage 10, on the basis of, for example, the destination information, the current position information of the own vehicle, and other supplementary information in step S120.

If the user notified of the possibility of the driving assistance control or the automatic driving control being canceled does not desire continuation of the driving assistance control or the automatic driving control ("NO" in step S420), the driving assistance control or the automatic driving control may be ended and switched to manual driving in step S430.

[Working and Effects]

As described above, in the vehicle 1A according to the example embodiment, in a case where the determination unit 91 determines that the driving assistance control or the automatic driving control is not continuable in a section for which the high-precision map information has been preferentially downloaded, the notification unit 92 may notify the user of the possibility of the driving assistance control or the automatic driving control being canceled in the current route.

This enables the user to find in advance, with a time margin, that the driving assistance control or the automatic driving control will be canceled and switched to the manual driving, and makes it possible to continue safe traveling even upon switching to the manual driving.

In a case where the determination unit 91 determines that the driving assistance control or the automatic driving control is not continuable, and where the user desires continuation of the driving assistance control or the automatic driving control, the route calculation unit 40 may re-calculate a new route that allows the driving assistance control or the automatic driving control to be continued.

Thus, even if the possibility of the driving assistance control or the automatic driving control being canceled occurs in the current route, it is possible to set a new route to the destination, making it possible to continue the driving assistance control or the automatic driving control in the new route.

Note that the vehicle 1 or 1A according to any of the example embodiments of the disclosure is implemented by storing the processing to be performed by each of the control unit 70 and the determination unit 91 in a recording medium readable by a computer system, causing each of the control unit 70 and the determination unit 91 to read a program stored in the recording medium, and executing the program.

The term "computer system" used herein may encompass hardware including operating systems (OS) and peripheral devices.

In a case where the computer system is a world wide web (www) system, the term "computer system" used herein shall encompass a website providing environment or a display environment. Additionally, the program stored in, for example, the storage device of the computer system may be transmitted to another computer system via a transmission medium or a transmission wave of the transmission medium. The transmission medium transmitting the program may refer to a medium having a function of transmitting information, including a network such as the Internet (a communication network) and a communication line such as a phone line.

Further, the program described above may be a program for implementing part of the processing described above. Alternatively, the program described above may be a so-called differential file or differential program that implements the processing described above when being combined with a program having been stored in the computer system.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the foregoing example embodiments describe, as an example, the vehicle 1 or 1A that centrally implements processing on the vehicle side. However, a system may be configured in which processing implementable by each of the control unit 70 and the determination unit 91 and the second map storage 61 are separated from the vehicle 1 or 1A and implemented by a server.

Configuring such a system makes it unnecessary for equipment on the vehicle side to download the high-precision map, which enables high-speed processing by simple control.

According to one or more embodiments of the disclosure, it is possible to preferentially download, for a section included in a traveling route to a destination and preliminarily stored as a section in which acquisition of high-precision map information to be used for driving assistance control or automatic driving control takes time, the high-precision map information of the section.

Each of the route calculation unit 40, the second map acquiring unit 60, the control unit 70, the determination unit 91, and the notification unit 92 illustrated in FIGS. 1 and 8 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the route calculation unit 40, the second map acquiring unit 60, the control unit 70, the determination unit 91, and the notification unit 92. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the route calculation unit 40, the second map acquiring unit 60, the control unit 70, the determination unit 91, and the notification unit 92 illustrated in FIGS. 1 and 8.

The invention claimed is:

1. A vehicle comprising:

a data storage configured to store data including:

(1) a navigation map; and (2) priority levels, associated with respective route sections of the navigation map, each indicating a priority for downloading data of a high-precision map corresponding to that route section, the priority levels including at least a first priority level assigned to route sections that are stored as sections where a communication issue is unlikely to occur, and a second priority level assigned to route sections that are stored as sections where communication hindrance is predicted; and a positioning sensor configured to acquire position information of the vehicle;

at least one processor coupled to at least one memory storing instructions for the at least one processor, the at least one processor being configured to:

accept information including destination information from a user of the vehicle;

calculate a route to a destination based on the destination information and the position information of the vehicle, using the navigation map;

download the high-precision map and store the downloaded high-precision map in the data storage;

control downloading of the high-precision map such that data of the high-precision map for a first section of the calculated route, to which the second priority level is assigned, is downloaded with higher priority than data of the high-precision map for a second section of the calculated route, to which the first priority level is assigned; and perform driving assistance control or automatic driving control to control using the downloaded high-precision map to cause the vehicle to travel along the calculated route, wherein, in controlling the downloading of the high-precision map, the at least one processor is further configured to:

determine a first portion and a second portion on the calculated route, the first portion and the second portion being located within the second section that is closer to the vehicle than the first section, the second portion being located farther from the vehicle than the first portion on the calculated route;

determine a first time at which downloading of first data should be started, the first data being data of the high-precision map corresponding to the second portion within the second section;

start downloading of second data before the first time, the second data being data of the high-precision map corresponding to the first portion within the second section;

after completion of the downloading of the second data and during a spare period before the first time, perform downloading of third data, the third data being data of the high-precision map corresponding to the first section;

start downloading of the first data after the first time;

determine whether the downloading of the third data has been completed within the spare period; and repeat the controlling of the downloading of the high-precision map in response to a determination that the downloading of the third data has not been completed.

2. The vehicle according to claim 1, the at least one processor is further configured to:

determine whether the driving assistance control or the automatic driving control is continuable along the first section of the calculated route, to which the second priority level is assigned and in response to determining that the driving assistance control or the automatic driving control is not continuable, notify the user of a possibility of the driving assistance control or the automatic driving control being canceled while the vehicle travels along the first section of the calculated route.

3. The vehicle according to claim 2, wherein, in response to determining both that the driving assistance control or the automatic driving control is not continuable along the first section of the calculated route and that the user desires continuation of the driving assistance control or the automatic driving control, the at least one processor is further configured to re-calculate a new route that allows the driving assistance control or the automatic driving control to be continued.

4. The vehicle according to claim 1, wherein, when the downloading of the third data has been started before the first time and the downloading of the third data has not been completed by the first time, the at least one processor is further configured to:

temporarily stop the downloading of the third data at the first time;

start the downloading of the first data after the first time while the downloading of the third data is temporarily stopped; and resume the temporarily stopped downloading of the third data after completion of the downloading of the first data.

5. A vehicle comprising:

a data storage configured to store data including:

(1) a navigation map; and (2) priority levels, associated with respective route sections of the navigation map, each indicating a priority for downloading data of a high-precision map corresponding to that route section, the priority levels including at least a first priority level assigned to route sections that are stored as sections where a communication issue is unlikely to occur, and a second priority level assigned to route sections that are stored as sections where communication hindrance is predicted; and a position sensor configured to acquire position information of the vehicle; and circuitry configured to:

accept information including destination information from a user of the vehicle;

calculate a route to a destination based on the destination information and the position information of the vehicle, using the navigation map;

download the high-precision map and store the downloaded high-precision map in the data storage;

control downloading of the high-precision map such that data of the high-precision map for a first section of the calculated route, to which the second priority level is assigned, is downloaded with higher priority than data of the high-precision map for a second section of the calculated route, to which the first priority level is assigned; and perform driving assistance control or automatic driving control to control using the downloaded high-precision map to cause the vehicle to travel along the calculated route, wherein, in controlling the downloading of the high-precision map, the circuitry is further configured to:

determine a first portion and a second portion on the calculated route, the first portion and the second portion being located within the second section that is closer to the vehicle than the first section, the second portion being located farther from the vehicle than the first portion on the calculated route;

determine a first time at which downloading of first data should be started, the first data being data of the high-precision map corresponding to the second portion within the second section;

start downloading of second data before the first time, the second data being data of the high-precision map corresponding to the first portion within the second section;

after completion of the downloading of the second data and during a spare period before the first time, perform downloading of third data, the third data being data of the high-precision map corresponding to the first section;

start downloading of the first data after the first time;

determine whether the downloading of the third data has been completed within the spare period; and repeat the controlling of the downloading of the high-precision map in response to a determination that the downloading of the third data has not been completed.

* * * * *